(12) United States Patent
Saito et al.

(10) Patent No.: US 7,374,413 B2
(45) Date of Patent: May 20, 2008

(54) INJECTION MOLDING MACHINE

(75) Inventors: Osamu Saito, Yamanashi (JP); Noriko Kitamura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 255 days.

(21) Appl. No.: 11/235,291

(22) Filed: Sep. 27, 2005

(65) Prior Publication Data
US 2006/0068050 A1 Mar. 30, 2006

(30) Foreign Application Priority Data
Sep. 28, 2004 (JP) ............................. 2004-282628

(51) Int. Cl.
*B29C 45/77* (2006.01)
(52) U.S. Cl. ...................... 425/145; 425/150
(58) Field of Classification Search ................. 425/145, 425/150
See application file for complete search history.

(56) References Cited

U.S. PATENT DOCUMENTS

| 5,539,650 | A | 7/1996 | Hehl |
| 6,073,059 | A | 6/2000 | Hayashi et al. |

FOREIGN PATENT DOCUMENTS

| JP | 61114831 | 6/1986 |
| JP | 05192975 | 8/1993 |
| JP | 06114907 | 4/1994 |
| JP | 7-156237 | 6/1995 |
| JP | 07156237 | 6/1995 |
| JP | 7-290545 | 11/1995 |
| JP | 9-239799 | 9/1997 |
| JP | 2002086530 | 3/2002 |

OTHER PUBLICATIONS

European Search Report for corresponding EP Patent Application No. 05255775.8-2307 dated Jan. 13, 2006.
"Selogica—The control unit for all Allrounder injection moulding machines", Arburg, May 2002, pp. 2-31, XP-002305034 (p. 5, col. 2, paragraph 1).

*Primary Examiner*—Tim Heitbrink
(74) *Attorney, Agent, or Firm*—Staas & Halsey LLP

(57) ABSTRACT

An injection molding machine that distinctively displays operation parameters attributed to molds, which are set by designating a mold to be used, and the other operation parameters, to thereby prevent setting errors. The machine has storage means for storing and saving the operation parameters attributed to molds, which are determined by molds, with respect to each mold, and storage means for operation parameters to be applied for operating the injection molding machine. In the storage means for operation parameters to be applied, the stored operation parameters attributed to molds are read out to be set, and the other operation parameters are each stored. When the operation parameters stored in the storage means for operation parameters to be applied are set and displayed, the display appearances of the operation parameters attributed to molds and that of the other operation parameters are differentiated from each other. In the drawings, parameters provided with ★ are operation parameters attributed to molds, and those not provided with ★ are the other parameters. The other operation parameters that need to be set and the operation parameters attributed to molds, which hardly need to be altered, are displayed distinctively, resulting in a reduction in setting errors.

5 Claims, 3 Drawing Sheets

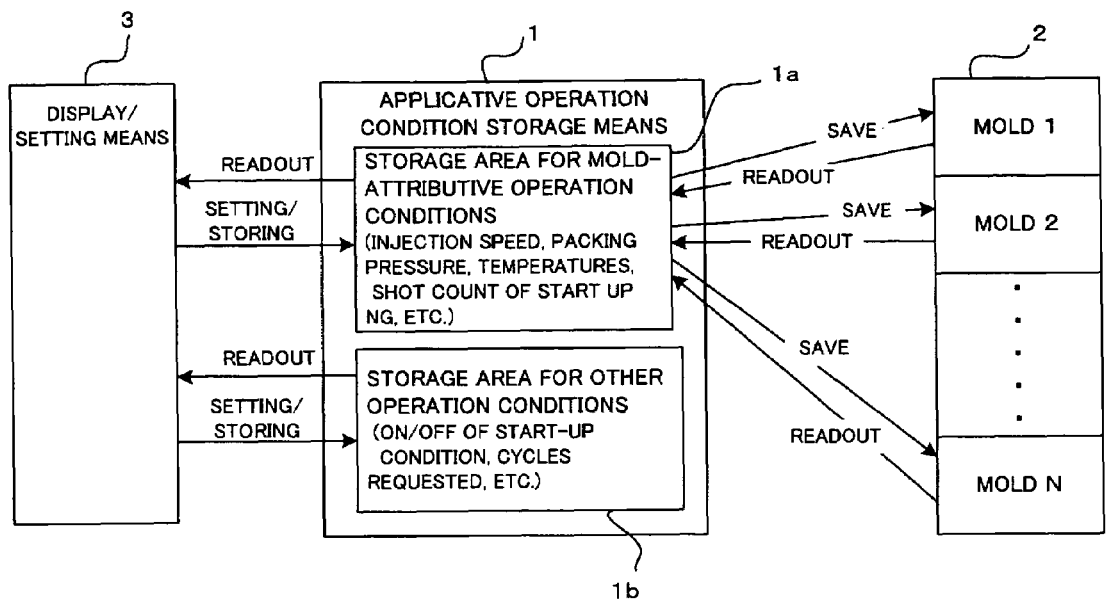

|  | INJECTION MOLDING MACHINE | PERIPHERAL EQUIPMENT A | PERIPHERAL EQUIPMENT B | PERIPHERAL EQUIPMENT C |
|---|---|---|---|---|
| MOLD-ATTRIBUTIVE OPERATION CONDITIONS | CHARACTERS: BLACK MARK ★ | CHARACTERS: RED MARK ★ | CHARACTERS: BLUE MARK ★ | CHARACTERS: PURPLE MARK ★ |
| OTHER OPERATION CONDITIONS | CHARACTERS: BLACK NO MARK | CHARACTERS: RED NO MARK | CHARACTERS: BLUE NO MARK | CHARACTERS: PURPLE NO MARK |

FIG. 3

| | ★SHOT COUNT | ★FIRST CONDITION INJECTION SPEED | ★SECOND CONDITION NOZZLE TEMPERATURE | ★THIRD CONDITION SHOT SIZE |
|---|---|---|---|---|
| | | START SETTING 1 | | |
| | START-UP | ON | | |
| 1 | 5 | 75% | 200.0 | 50.00 |
| 2 | 0 | 0% | 0.0 | 42.00 |
| 3 | 0 | 0% | 0.0 | 42.00 |
| 4 | 0 | 0% | 0.0 | 42.00 |
| 5 | 0 | 0% | 0.0 | 42.00 |

★PRODUCTION MANAGEMENT   ON

CYCLES REQUESTED   50000   SHOTS

★START UP NG   15   SHOTS

★NUMBER OF PARTS PER CONTAINER   1000   PARTS/CONTAINER

FIG. 4

TEMPERATURE SETTING

| 40.0 | 200.0 | 210.0 | 200.0 | 190.0 | 40.0 | 40.0 | °C |
|---|---|---|---|---|---|---|---|
| ★MOLD | ★NOZZLE | | ★BARREL | | ★UNDERNEATH OF HOPPER | ★DRYING | |

INJECTION MOLDING MACHINE

BACKGROUND OF THE INVENTION

1. Field of the Invention

The present invention relates to an injection molding machine, and more specifically to display and setting in which categorization of operation parameters for operating an injection molding machine is apparent.

2. Description of Related Art

In order to operate an injection molding machine, it is necessary to set a large number of operation parameters, such as molding parameters.

As to these operation parameters, a display device is used to display the operation parameters on the screen, to thereby set the selection, setting values, and the like, of the operation parameters. It is well-known that, among the operation parameters, three kinds of operation parameters, including an automatic operation parameter, a semiautomatic operation parameter, and an operation parameter common to the automatic operation parameter, the semiautomatic operation parameter and a manual operation parameter, are displayed in different colors, to thereby distinctively display the categorization of operations (JP 7-290545A).

There is another well-known invention in which operation errors are reduced by allotting different figures and/or colors to the factors including speed, position, pressure, and time that are displayed on the screen (JP 7-156237A).

In further another well-known invention, among the molding information data that is set with respect to molded parts and the setting data concerning the control system of the machine, the machine characteristic value data accessible to the user, to which the user makes a setting alteration by him/herself, and the machine characteristic value data inaccessible to the user, which is set by the manufacturing corporation and does not allow the user to make a setting alteration, are stored in their respective areas separately from each other so that the data may be selectively initialized by using the storage areas individually or in arbitrary combination. This facilitates the data initialization and the setting after the initialization, which are carried out by the user. In favor of the manufacturing corporation, the manpower for initialization control at the stage of factory shipment is reduced (JP 9-239799A).

At the same time, as a large number of operation parameters need to be set, an injection molding machine that facilitates the work of setting the operation parameters is generally used. Operation parameters attributed to molds, which are automatically determined by the molds to be used, are stored with respect to each mold. When the mold to be used is determined, operation parameters stored correspondingly to the mold are called up and stored in a storage area for storing the operation parameters to be applied. The other operation parameters are each set and stored in the storage area for the operation parameters to be applied. Based on the operation parameters stored in the storage area for the operation parameters to be applied, the operation of the injection molding machine is controlled.

In early molding machines, operation parameters were not digital data. Therefore, the operation parameters could not be saved, so that it was necessary to set all the operation parameters every time molds were exchanged.

Since the control of molding machines had gradually been digitalized, the operation parameters had been replaced with digital data accordingly. Taking advantage of the fact that digital data can be stored in a nonvolatile memory, means for collectively storing and reading the operation parameters attributed to molds began to be widely used. Because of the above means, the operator's work for setting the operation parameters was drastically reduced. All the operator has to do is then to check the read-out operation parameters (those attributed to a mold) and to set the other operation parameters (those not attributed to the mold).

In general, the differentiation between the operation parameters attributed to molds and those not attributed molds is made on the basis of design produced by the manufacturing corporation of the injection molding machine. This differentiation, however, does not always agree with the differentiation recognized by the operator. This arouses a situation in which an operation parameter considered by the operator as one attributed to a mold is not the operation parameter attributed to the mold, or a situation in which an operation parameter that is not considered by the operator as one attributed to a mold is the operation parameter attributed to the mold.

An "ON/OFF" switch for start-up parameter will be described below as an example. This operation parameter is not attributed to a mold, so that it is not subjected to the setting when the operation parameters attributed to the mold are collectively read out. Therefore, the operator has to carry out the proper setting (switch ON) before operation. If the operator makes the mistake of taking the above parameter as one attributed to a mold, however, the operator does not perform the proper setting (switch ON). As a result, it is impossible to make the efficient transition from an unstable molding environment at the initial stage of the molding to a stable molding environment.

The forcible number of defective products will be described below as another example. This operation parameter is the number (shot) of molded parts that are forcibly discarded at the start of the molding. Usually, the number (shot) in which the molded parts are changed from defectives into non-defectives is set. The forcible number of defective products is an operation parameter attributed to a mold, so that it is set when the operation parameters attributed to the mold are collectively read out. If the operator makes the mistake of considering that the forcible number of defective products is not an operation parameter attributed to a mold, and after changing the forcible number of defective products, makes the forcible number of defective products stored collectively as an operation parameter attributed to a mold without setting the number back to the original value, there arises a problem later. For example, suppose that the operator changes the forcible number of defective products from 15 to 0, for the molded parts are non-defective, and makes the forcible number of defective products stored as an operation parameter attributed to a mold without setting the forcible number of defective products back to the original. Later, for the purpose of using the same mold, another operator reads out the operation parameters attributed to the mold collectively to find that the forcible number of defective products is 0. However, if the operator makes the right decision that the forcible number of defective products is an operation parameter attributed to the mold, he/she starts the molding without setting the forcible number of defective products back to the original value (15). As a result, defectives at the initial stage of the molding are not discarded and mixed with non-defectives, which obstructs the quality control.

Furthermore, the injection molding machine is provided with peripheral equipment of various types, including a molded part-retrieving device, a temperature controller, etc. In some cases, operation parameters are displayed and set with respect to these pieces of the peripheral equipment together with the operation parameters for the injection molding machine. When these operation parameters are displayed among those for the injection molding machine, it is sometimes hard for the operator to differentiate between the operation parameters for the injection molding machine and those for the peripheral equipment among the operation parameters displayed.

SUMMARY OF THE INVENTION

The present invention enables an operator to distinguish operation parameters attributed to molds from the other operation parameters, and also to distinguish operation parameters for operating an injection molding machine from operation parameters for operating peripheral equipments.

An injection molding machine of the present invention performs an injection molding operation using a mold selected from a plurality of molds. According to one aspect of the present invention the injection molding machine comprises: specifying means for specifying mold-attributive operation parameters attributed to the mold and mold-unattributive operation parameters not attributed to the mold in operation parameters to be applied to the injection molding operation; and display means for displaying the mold-attributive operation parameters and the mold-unattributive operation parameters specified by the specifying means such that a display appearance of the mold-attributive operation parameters is distinguished form a display appearance of the mold-unattributive operation parameters.

The injection molding machine may further comprise storage means storing the mold-attributive operation parameters in groups respectively set for different kinds of molds, selecting means for selecting a group of the mold-attributive operation parameters and reading means for reading the group of the mold-attributive operation parameters selected by the selecting means from the storage means to be set as the operation parameters to be applied to the injection molding operation.

According to another aspect of the present invention, the injection molding machine comprises: applicative operation parameter storage means for storing operation parameters to be applied to the injection molding operation; setting/display means for setting and displaying the operation parameters in the applicative operation parameter storage means; mold-attributive operation parameter storage means storing mold-attributive operation parameters attributed to the molds in groups respectively set for the plurality of molds; means for transferring a group of the mold-attributive operation parameters in the mold-attributive operation parameter storage means to the applicative operation parameter storage means; means for transferring the mold-attributive operation parameter in the operation parameter storage means to the mold-attributive operation parameter storage means, wherein the setting/display means displays the mold-attributive operation parameters to have a first display appearance and mold-unattributive operation parameters not attributed to the molds to have a second display appearance distinguished from the first display appearance.

The setting/display means may further display operation parameters for operating peripheral equipments of the injection molding machine with display appearances different from the first and second appearances.

The display/setting means may display the operation parameters of different peripheral equipments to have different display appearances respectively assigned to the peripheral equipments.

The mold-attributive operation parameter storage means may separately store different groups of operation parameters attributed to the same mold.

The display appearances may be distinguished by different properties of characters or symbols indicating the operation parameters or marks added to the characters or symbols.

The operation parameters to be applied to the injection molding operation may be selectable by an operator to be the mold-attributive operation parameters or the mold-unattributive operation parameters.

Since the operation parameters determined by a mold and the other operation parameters are distinguished in display appearances and are displayed so that they can be identified, it is possible to discriminate the operation parameters that must be set and displayed and the operation parameters that are automatically set by designating a mold to be used, which prevents an error in setting the operation parameters. Additionally, the operation parameters with respect to the peripheral equipment are also distinctively displayed to have different display appearances, so that it is possible to prevent an error in setting the operation parameters with respect to the peripheral equipment.

BRIEF DESCRIPTION OF THE DRAWINGS

FIG. 1 is a block diagram showing a substantial part in a controller of an injection molding machine according to one embodiment of the present invention;

FIG. 2 is an explanatory view showing one example of display appearances of operation parameters according to the present invention;

FIG. 3 is a view showing one example of a display according to one embodiment of the present invention;

FIG. 4 is a view showing another example of a display according to the same embodiment.

DETAILED DESCRIPTION

Figure 5:
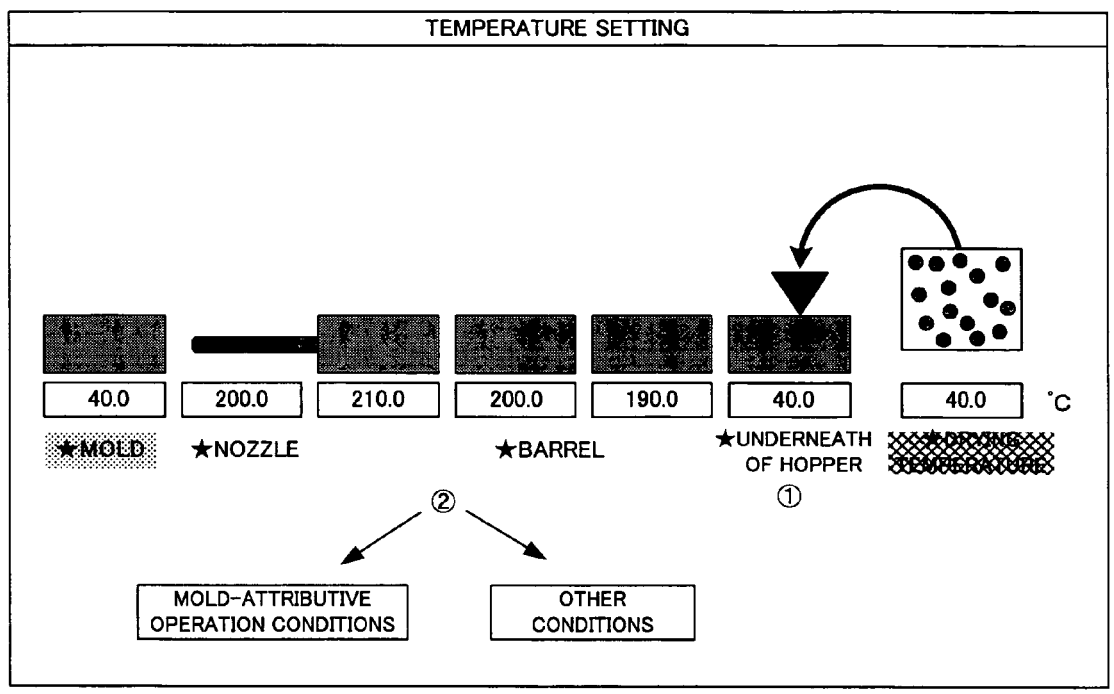
FIG. 5 is a view showing further another example of a display according to the same embodiment.

FIG. 1 is a block diagram showing a substantial part related to the present invention, which is provided in a controller of an injection molding machine according to one embodiment of the present invention. The controller of the injection molding machine is, as usual, constructed from a processor, a memory, an input/output circuit, a display device, and manual input means. Referring to FIG. 1, reference numeral 1 represents applicative operation parameter storage means which is provided in the memory of the controller and stores operation parameters on which the controller controls the injection molding machine. The controller drivingly controls the injection molding machine according to the operation parameters that are set and stored in the applicative operation parameter storage means 1. The applicative operation parameter storage means 1 is divided into a mold-attributive operation parameter storage area 1a for storing operation parameters attributed to the mold and a storage area 1b for storing other operation parameters.

If a mold used in the injection molding machine is different, operation parameters of the injection molding machine, which include molding parameters, are also different. Even if the mold is identical, if a different kind of resin is used, the operation parameters are different. Furthermore, even if the mold and the resin to be used are identical, operation parameters are occasionally replaced with the other parameters for some reason. According to the present invention, a group of the operation parameters that are determined by a mold, resin, and other factors, and are not necessary to be altered function as the operation parameters attributed to molds. The operation parameters attributed to molds are stored and saved according to each mold ID in mold-attributive operation parameter storage means 2 constituted by a rewritable nonvolatile memory, such as a nonvolatile RAM, disposed in the controller. When used, a mold-attributive operation parameter, which is stored in the mold-attributive operation parameter storage means 2 is called up by designating the mold ID, and is set and stored in the mold-attributive operation parameter storage area 1a of the applicative operation parameter storage means 1. Moreover, the operation parameters stored in the mold-attributive operation parameter storage area 1a are stored and saved in the mold-attributive operation parameter storage means 2 together with the mold ID.

The storage area 1b for storing other operation parameters is an area that stores operation parameters other than those attributed to molds, that is to say, those not determined by molds, including "whether the start-up parameter should be turned ON or not", "Cycles requested" and the like. The operation parameters stored in the above area needs to be set every time the molds are exchanged to start the molding of molded articles.

The operation parameters that are stored in the applicative operation parameter storage means 1 are read out by a command from display/setting means 3 formed of display means, such as a CRT and liquid crystal, a keyboard, a mouse, and other pointing devices, to be displayed on the screen of the display means. By the command from the display/setting means 3, the mold-attributive operation parameter storage area 1 a of the applicative operation parameter storage means 1 is stored in the mold-attributive operation parameter storage means 2 together with the mold ID. In addition, if the mold ID is designated by the display/setting means 3, the mold-attributive operation parameters are read out and set in the applicative operation parameter storage means 1.

According to the present invention, at the time of the display, the mold-attributive operation parameters which are stored in the mold-attributive operation parameter storage area 1a and the operation parameters other than the mold-attributive operation parameters which are stored in the other operation parameter storage area 1b are displayed to have different display appearances, so that it is possible to visually recognize whether the operation parameters displayed are those attributed to molds or the other operation parameters.

As to a method of altering the display appearances, the display appearances are altered by changing display properties, such as kinds of fonts, sizes, bold type, italic type, underlines, hatching, display colors, boxed characters, and the like of display characters and numerals, and furthermore the display appearances are altered by adding icons and marks, to thereby distinctively display the mold-attributive operation parameters and the other operation parameters. It is also possible to alter background colors of rows in which operation parameter items, set values, and the like are displayed. In this case, if the display appearances are identical, the background color of the entire screen is the same. In case that a display property, such as a color, is given to a display item, it is possible to set a corresponding display property every time a display item is provided. Alternatively, it is also possible to set the properties with respect to the display items separately.

There is the case in which peripheral equipment, such as a molded part-retrieving device and a temperature controller associated with the molding, is disposed around the injection molding machine, and these peripheral devices are controlled by the controller of the injection molding machine, or the case in which operation parameters of these peripheral devices are set and controlled. According to the present invention, the operation parameters of such peripheral equipment are differentiated and displayed to have display appearances different from others.

FIG. 2 is an explanatory view of an example of the display appearances. In this example, the injection molding machine is provided with three kinds of peripheral equipment A, B and C. In this example, it is set that the operation parameters for the injection molding machine are displayed in "black", the operation parameters for the peripheral equipment A in "red", the operation parameters for the peripheral equipment B in "blue", and the operation parameters for the peripheral equipment C in "purple" to appear with different colors, and the operation parameters attributed to molds are displayed with marks "★".

If the display color of characters indicating an operation parameter is "black", and a mark "★" is put, it is considered to be the operation parameter attributed to a mold of the injection molding machine (the operation parameter of the injection molding machine, which is determined by a mold). If the display color of an operation parameter is "red", and a mark "★" is put, it is considered to be the operation parameter attributed to a mold associated with the peripheral equipment A. If the display color of an operation parameter is "blue", and no "★" mark is put, it is considered to be the operation parameter other than that attributed to a mold associated with the peripheral equipment B. As described, it is possible to judge whether the operation parameter is the operation parameter associated with the injection molding machine, which peripheral equipment is the operation parameter associated with, and moreover whether the operation parameter is the operation parameter attributed to a mold, based on the display color of characters and numerals of the operation parameter displayed, and the presence of the mark, thereby reducing the possibility of false setting.

In case that the operation parameters are displayed on the screen, generally, an operation parameter item and a set value thereof are displayed in a pair. In some cases, however, a button for making the operation parameter item and the operation parameter thereof effective/invalid or ON/OFF is displayed. In another case, although the operation parameter items per se are not displayed, a diagram or graph related to the operation parameters is displayed, and only the set values of the operation parameters are displayed to be set and inputted. Therefore, the display appearance is designed to correspond to both the operation parameter items and the set values.

In the present embodiment, explanations will be provided below on the premise that the display is created to have the display appearance as shown in FIG. 2. The operation parameters attributed to a mold are stored with marks "★", and moreover the operation parameters associated with the injection molding machine are stored with a property of black color as a display property. The operation parameters of the peripheral equipment A, those of the peripheral equipment B, and those of the peripheral equipment C are stored with a property of "red" color, that of "blue" color, and that of "purple" color, respectively.

FIG. 3 is an example of a display of "Start setting 1" that is set when the operation of the injection molding machine is started. The operation parameters shown in the display of the "Start setting 1" illustrated in FIG. 3 are all associated with the operation parameters of the injection molding machine, and the display color of the operation parameters is all black. An upper row is a row for setting start-up parameter since the setting of ON/OFF of the start-up parameter is not associated with the operation parameters attributed to molds, there is no "★" mark provided. However, the other operation parameters, namely the shot count and first to third parameters, are operation parameters attributed to molds, which are determined by a mold, so that they are displayed with marks "★".

A lower row of FIG. 3 shows operation parameters that are set as to molded parts. "Production management" as to whether a production management is carried out or not, "Start up NG" for setting the number of molded parts to be discarded as defective molding at the start of the molding, and "Number of parts per container" for setting the number of the molded parts stored in one container are operation parameters attributed to molds, which are determined by a mold, so that they are displayed with marks "★". "Cycles requested" for determining the number of molded parts to be produced, however, is not a matter determined by the mold, and is included in the other operation parameters. Therefore, it is not provided with a mark "★".

The operation parameters attributed to molds are not altered in general except under special circumstances. In the display, marks "★" are provided to the operation parameters attributed to a mold, so that the operator understands that an alteration of set values or the like should not be made with respect to the parameter items provided with marks "★". This prevents the operator from accidentally carrying out the altering operation of the set values. If making an alteration, the operator becomes careful. When the operation parameter attributed to a mold is stored and saved in the mold-attributive operation parameter storage means 2, the operator determines whether the altered set value should be set back to the original or should be selected and saved as it is, and gives a save command. Moreover, it is also possible that if an operation parameter attributed to a mold is altered, the set value before the alteration is stored. When the save command of the operation parameter attributed to a mold is inputted through the display/setting means, the screen displays the fact that there has been an alteration made to the set value of the operation parameter attributed to a mold, and the set value of the altered operation parameter before the alteration and a current set value thereof. Then, the display is checked, and furthermore the set value is set back to the original, to thereby store and save the operation parameter attributed to a mold in the mold-attributive operation parameter storage means 2. Additionally, it is also possible to make a choice between overwriting and storing the operation parameter attributed to a mold in the mold-attributive operation parameter storage means 2 and exiting without storing the operation parameter attributed to a mold.

FIG. 4 is an example of a display of temperature setting. In this display, a mold, a nozzle, a barrel, a feed throat, and a resin material (pellet) are shown in a schematic diagram, and operation parameters are displayed correspondingly. All of the operation parameters shown in this display are those attributed to molds, and operation parameter items are all provided with marks "★". The "Mold" is displayed by hatching, which indicates an operation parameter with respect to a temperature controller that is peripheral equipment. According to the example of FIG. 2, it means that the operation parameter item of the "Mold" is displayed in a color allotted to the temperature controller.

Similarly, "Drying temperature" denotes an operation parameter (preset temperature) of a dryer for drying the pellets of the resin material. The "Drying temperature" is displayed by hatching in FIG. 4, and according to the example of FIG. 2, it means that the "Drying temperature" is displayed in a color allotted to the dryer.

From the display shown in FIG. 4, it is possible to know as to whether an operation parameter is associated with the injection molding machine or with the peripheral equipment, and if the parameter is associated with the peripheral equipment, it is also possible to distinguish each pieces of the peripheral equipment per se, to thereby understand the operation parameter. Compared to the case in which the operation parameters are uniformly displayed as usual, it is possible to more apparently recognize the subjects of operation parameters and whether the operation parameter is determined by a mold, thereby making it possible to prevent an error in setting the operation parameters.

FIG. 5 shows the contents of FIG. 4 and buttons for setting the attribution of the respective operation parameters. The buttons for setting the attribution include a "Parameters attributed to molds" button (mold-attributive operation parameters which are attributed to a mold) and an "Other parameters" button (other operation parameters unattributive to molds). For example, if the operator intends to set the temperature of the feed throat, which is included in the parameters attributed to molds, so as to be included in the other parameters, all the operator has to do is to select the temperature of the feed throat and push the "Other parameters" button. By so doing, the temperature of the feed throat is changed to be included in the other parameters, and at the same time, the mark "★" put to the temperature of the feed throat disappears from the display. In the same manner, in order to set an operation parameter that has been set to be included in the other parameters so as to be included in the parameters attributed to molds, all the operator needs to do is to select the subject operation parameter and push the "Parameters attributed to molds" button. Although in the present example, the properties are altered by using the buttons, another means may be used instead as long as the properties can be altered. For example, there is means in which pop-up switches instead of buttons are displayed, and properties are selected through the switches. Another conceivable means sorts out only "Parameters attributed to molds" from the screen on which a list of operation parameters is displayed.

In the above-described embodiment, the storage means for operation parameters attributed to molds is disposed in the injection molding machine. It is possible, however, to dispose the storage means for operation parameters attributed to molds in a control device or the like other than the injection molding machine, and connect the control device and the injection molding machine through communication network or the like. Then the injection molding machine may read out or store the operation parameters attributed to molds through the communication network. In this case, by connecting a plurality of injection molding machines to the communication network and sharing one control device, it is possible to share the storage means for operation parameters attributed to molds among all the injection molding machines connected to the communication network.

What is claimed is:

1. An injection molding machine performing an injection molding operation using a mold selected from a plurality of molds, comprising:

applicative operation parameter storage means for storing operation parameters to be applied to the injection molding operation;

setting/display means for setting and displaying the operation parameters in said applicative operation parameter storage means;

mold-attributive operation parameter storage means storing mold-attributive operation parameters attributed to the molds in groups respectively set for the plurality of molds;

means for transferring a group of the mold-attributive operation parameters in said mold-attributive operation parameter storage means to said applicative operation parameter storage means;

means for transferring the mold-attributive operation parameter in said applicative operation parameter storage means to said mold-attributive operation parameter storage means, wherein said setting/display means includes a display which displays the mold-attributive operation parameters to have a first display appearance and which displays mold-unattributive operation parameters not attributed to the molds to have a second display appearance distinguished from the first display appearance, and wherein said setting/display means further displays operation parameters for operating peripheral equipment of the injection molding machine with display appearances different from the first and second appearances.

2. An injection molding machine according to claim 1, wherein said display/setting means displays the operation parameters of different items of peripheral equipment to have different display appearances respectively assigned to the items of peripheral equipment.

3. An injection molding machine according to claim 1, wherein said mold-attributive operation parameter storage means separately stores different groups of operation parameters attributed to the same mold.

4. An injection molding machine according to claim 1, wherein the display appearances are distinguished by different properties of characters or symbols indicating the operation parameters or marks added to the characters or symbols.

5. An injection molding machine according to claim 1, wherein the operation parameters to be applied to the injection molding operation are selectable to be the mold-attributive operation parameters or the mold-unattributive operation parameters.

* * * * *